Dec. 14, 1948.  A. J. LOEPSINGER  2,456,203
COUPLING FOR TUBULAR MEMBERS
Filed Aug. 21, 1943
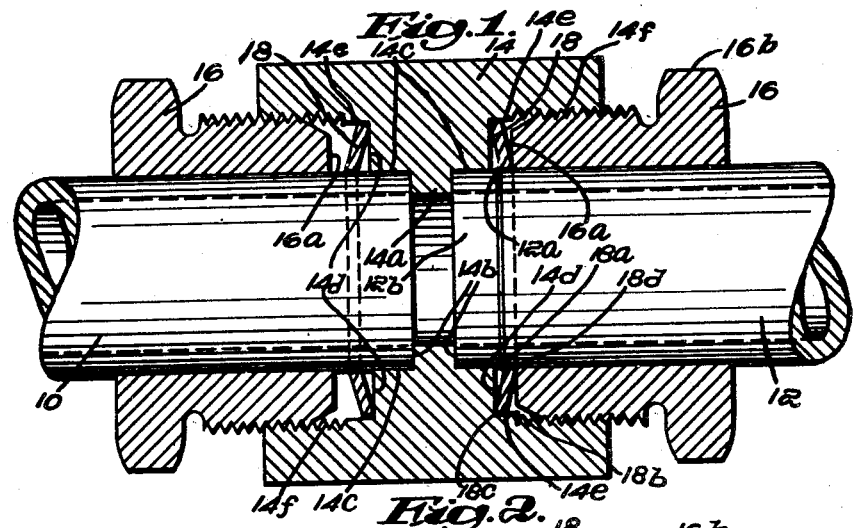
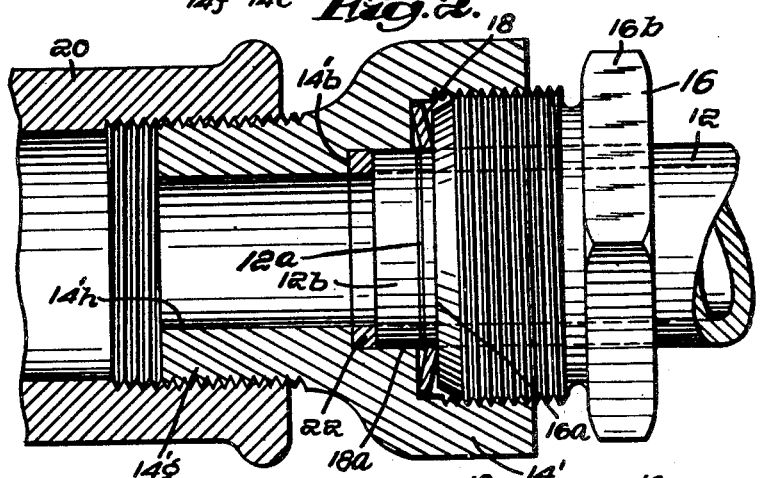
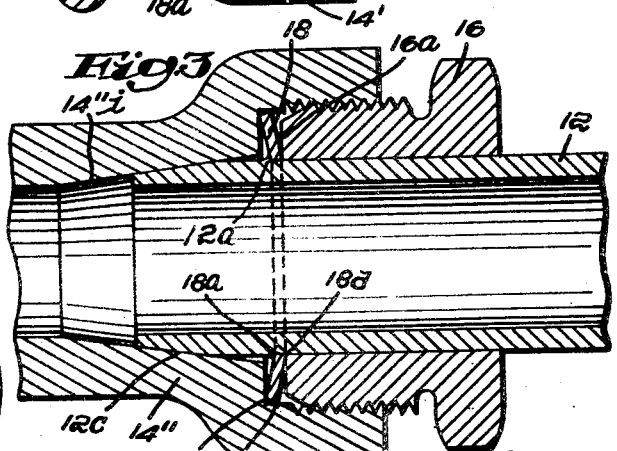
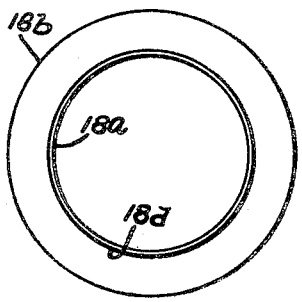

Patented Dec. 14, 1948

2,456,203

UNITED STATES PATENT OFFICE 2,456,203

COUPLING FOR TUBULAR MEMBERS

Albert J. Loepsinger, Providence, R. I., assignor to Grinnell Corporation, Providence, R. I., a corporation of Delaware Application August 21, 1943, Serial No. 499,745

2 Claims. (Cl. 285—166)

This invention relates to improvements in couplings for tubular members. More especially it has to do with a coupling whereby the ordinary unthreaded end of a tubular member may be coupled to a similar end of another such member or to a fitting.

One object of this invention is to provide a simple coupling which can be applied to the external surface of a tubular member and effect a tight joint therewith without previously threading, flaring, upsetting or otherwise altering the tubular member and without disturbing the internal surface thereof when the joint is made. It is a feature of the improved coupling that it locks itself against becoming loose inadvertently as by vibration, and yet may be loosened and retightened a number of times without loss of the essential tightness of the joint.

The invention may be used with pipes or tubing made of metal, plastics or other suitable material.

The best mode in which I have contemplated applying the principles of my invention is shown in the accompanying drawings but these are to be taken as merely illustrative because it is intended that the patent shall cover by suitable expression in the appended claims whatever features of patentable novelty exist in the invention disclosed.

In the drawings:

Figure 1 is a medial section of a coupling embodying my invention and adapted to couple two tubular members together;

Figure 2 is a similar section showing a coupling adapted to connect a tubular member to a fitting;

Figure 3 is a like section showing a modification; and

Figure 4 is a face view of the preferred form of washer used in the improved coupling.

Referring particularly to Figure 1, there is shown a coupling for joining the ends of two tubular members 10 and 12. The coupling in this form comprises a body 14, two nuts 16 and two washers 18. At the left of the figure the tubular member 10 is shown as being merely inserted within the body with its edge abutting the radial surface or shoulder 14b of an annular portion 14a centrally disposed within the body. The washer 18 is loose, as it were, and the nut 16 is not tightened. At the right of the figure the nut 16 is shown tightened with the washer 18 pressed into joint making position.

The central passage through the internal annular portion 14a is of substantially the same diameter as the internal diameter of the tubular members to be coupled. Each radially disposed surface or shoulder 14b extends to a cylindrical surface 14c of slightly greater diameter than the outer surface of a tubular member. From each cylindrical surface 14c another radially disposed surface or shoulder 14d extends outward and from the outer edge of this last mentioned surface another cylindrical surface 14e extends to the end of the body. A portion of this cylindrical surface 14e is threaded at 14f for engagement with the external threads on a hollow nut 16 which encircles the tubular member.

The nut 16 has a flat surface 16a to engage the washer 18 and at its other end has angularly disposed flat surfaces 16b to accommodate a wrench.

The washer 18, as seen in Fig. 4, is a continuous dished ring made from resilient material preferably harder than the tubular member to which it is to be applied. The dishing provides a ring of rectangular cross section having its inner and outer edge surfaces at right angles to the concave and convex conical surfaces. The innermost edge 18a, the one of smallest diameter, should be of such size as to enable the washer to slip along the tubular member and make contact with a shoulder 14d. The outermost edge 18b, the one of greatest diameter, should slip by the threaded portion 14f and lie close to the cylindrical surface 14e of the body.

To make the joint between a tubular member and the body 14 the nut 16 is slipped along the member and the washer may either be slipped on to the end of the member or placed within the body 14. The washer should be so positioned that the inner edge will be adjacent the nut with the convex conical surface diverging therefrom. The tubular member is introduced into the body until its edge contacts the shoulder 14b. The nut is then screwed in far enough to somewhat undish or partially straighten out the washer 18. As this change of shape of the washer begins, the edge 18a of smallest diameter is extended slightly inward toward the tubular member and the edge 18b of greatest diameter is extended outward into tight contact with the cylindrical surface 14e of the body. Further undishing or straightening of the washer causes the edge 18a of smallest diameter to move along the surface of the tubular member with a shearing effect, slightly cutting into the member and piling up a sort of dam 12a of the material ahead of it against the concave surface of the washer. This in no wise disturbs the internal dimension of the tubular member.

Although the partial straightening out of the washer produces only a relatively slight scraping or shearing of the outer surface of the tubular member, nevertheless the edge 18a of smallest diameter on the washer forms an exceedingly tight joint with the tubular member and the edge of greatest diameter 18b on the washer forms a similar tight joint with the body 14. Moreover the other outer edge 18c of the washer is pressed firmly against the shoulder 14d of the body and the trailing inner edge 18d of the washer is likewise pressed against the flat face 16a of the nut. Thus when tightened there are four circular lines of contact between the washer and the body of the coupling, the nut, and the tubular member, and there is the tight contact between the dam and the concave surface of the washer.

The tightness of my improved coupling is so pronounced that the inner edge 12b of a tubular member need not be carefully formed to fit the shoulder 14b but may be the sort of edge usually left after cutting a tubular member with a pipe cutter or hack saw. This, and the fact that there is no need for any threads to be cut and no flaring or upsetting to be done, makes my improved coupling especially useful in the field where facilities for such deforming operations may not conveniently be available. And even where such are at hand my improved coupling is of advantage because the time of threading or otherwise preparing a tubular member is saved. Furthermore, since there is no deformation of the tubular member, other than the slight dam 12a formed on the external surface, the full strength of its wall is retained.

In Figure 2 my improved coupling is shown in the form adapted to connect a tubular member to a fitting 20. In this embodiment the body 14' is provided with an externally threaded end 14'g to be screwed into the usual threaded opening of the fitting. This end has a passage 14'h of substantially the same size as the pipe passage. In this figure there is shown a washer 22, which may be used, if desired, between the inner edge 12b of the tubular member 12 and the shoulder 14'f. When the nut 16 is screwed into the body to undish the washer 18 and force the inner edge 18a of the latter to shear along the surface of the tubular member, the edge of the latter is forced tightly against the washer 22, if used, thus additionally sealing the joint.

In Fig. 3, the body 14" of the coupling is provided internally with a formed tapered surface 14"i. By providing a correspondingly tapered surface 12c on the tubular member, the two tapered surfaces can be pressed tightly together when the nut 16 is screwed into the body 14". Here, again, the shearing action of the nut on the surface of the tubular member forces the latter into the body and in this particular arrangement presses the tapered surfaces tightly together.

Since, as before noted, the washer 18 is of somewhat resilient material it acts as a sort of lock washer to keep the nut 16 from loosening even though the coupling may be subjected to considerable vibration. However, the nut may readily be backed off if desired and as it retracts from the washer the latter returns to its original formed shape. This enables the tubular member to be withdrawn from the body. Thereafter the member, washer and nut can be returned to the body and the joint re-established as before.

I claim:

1. A coupling for a tubular member comprising a body having an opening to receive the member, having means for limiting the movement of the member along the axis of the body and having an internal shoulder within said body extending radially outward from the surface of said tubular member; a continuous dished washer housed within said body, encircling the tubular member, and having its concave side toward the said shoulder with the inner circular edge of said concave side closely adjacent the external surface of the tubular member and with the inner edge of its convex side outstanding from said member; and a hollow nut encircling said member having threaded engagement with said body and having a flat faced end for engaging the said edge of the convex side of the washer; the said washer, upon the nut being screwed into the body, being partially undished and moved outward along the face of said internal shoulder while the said inner edge of the concave side is moved along the tubular member with a shearing action on the surface thereof whereby a dam is formed against the concave surface of the washer, and the tubular member is forced against said limiting means.

2. A coupling for a tubular member comprising a body having a surface for engagement with the end of said member, a cylindrical surface parallel to and separated from the external surface of the member, and a shoulder outstanding from said member to said cylindrical surface; a continuous dished washer having a ring of rectangular cross section with one of its outer edges against said shoulder, with its other outer edge closely adjacent to the said cylindrical surface of the body, with its inner edge of smallest diameter adjacent the external surface of the member, and with its other inner edge of greatest diameter outstanding from the external surface of said tubular member; and means encircling said member capable of being moved relatively to said body and said member to partially undish the washer; the washer spreading outward until its said other outer edge engages the said cylindrical surface and then moving about said other outer edge as a circular fulcrum to cause the said edge of smallest diameter on the washer to act with shearing effect on the external surface of the tubular member during the undishing of the washer whereby a dam is formed against the concave surface of the washer.

ALBERT J. LOEPSINGER.

REFERENCES CITED

The following references are of record in the file of this patent:

UNITED STATES PATENTS

| Number | Name | Date |
|---|---|---|
| 1,440,207 | Burns | Dec. 26, 1922 |
| 1,725,975 | Bystricky | Aug. 27, 1929 |
| 2,114,771 | Turner et al. | Apr. 19, 1938 |

FOREIGN PATENTS

| Number | Country | Date |
|---|---|---|
| 341,145 | Great Britain | Jan. 15, 1931 |